(12) United States Patent
Yang et al.

(10) Patent No.: US 11,431,794 B2
(45) Date of Patent: Aug. 30, 2022

(54) SERVICE DEPLOYMENT METHOD AND FUNCTION MANAGEMENT PLATFORM UNDER SERVERLESS ARCHITECTURE

(71) Applicant: Huawei Cloud Computing Technologies Co., Ltd., Guizhou (CN)

(72) Inventors: Lei Yang, Xi'an (CN); Haijuan Zhang, Madrid (ES); Shaohui Liu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 16/824,321

(22) Filed: Mar. 19, 2020

(65) Prior Publication Data

US 2020/0220924 A1  Jul. 9, 2020

Related U.S. Application Data

(63) Continuation of application No. PCT/CN2017/109973, filed on Nov. 8, 2017.

(51) Int. Cl.
| | |
|---|---|
| *H04L 29/08* | (2006.01) |
| *H04L 29/06* | (2006.01) |
| *H04L 67/1074* | (2022.01) |
| *H04L 67/60* | (2022.01) |
| *H04L 67/01* | (2022.01) |

(52) U.S. Cl.
CPC ......... *H04L 67/1074* (2013.01); *H04L 67/32* (2013.01); *H04L 67/42* (2013.01)

(58) Field of Classification Search
CPC ..... H04L 67/32; H04L 67/1074; H04L 67/10; H04L 12/46; H04L 67/42
See application file for complete search history.

(56) References Cited

U.S. PATENT DOCUMENTS

| | | | | |
|---|---|---|---|---|
| 7,565,484 | B2 * | 7/2009 | Ghosal | G06F 3/0611 711/112 |
| 7,730,478 | B2 * | 6/2010 | Weissman | G06F 21/6227 717/171 |
| 10,033,595 | B2 * | 7/2018 | Sif | G06F 9/45533 |
| 10,977,608 | B2 * | 4/2021 | Scheer | G06Q 20/203 |
| 2010/0198730 | A1 * | 8/2010 | Ahmed | G06F 21/6209 705/50 |

(Continued)

FOREIGN PATENT DOCUMENTS

| | | |
|---|---|---|
| CN | 104145458 A | 11/2014 |
| CN | 104579898 A | 4/2015 |

(Continued)

*Primary Examiner* — Abdullahi E Salad
(74) *Attorney, Agent, or Firm* — Conley Rose, P.C.

(57) ABSTRACT

In a service deployment method performed by a function management platform that includes a function scheduler and a function executor manager, the function scheduler receives a function call request that carries a function identifier, selects an available host based on resource pool information of a tenant, and sends a function instance creation request to the function executor manager. The function executor manager receives the function instance creation request, selects the host corresponding to the host identifier from the resource pool of the tenant, and creates a function executor corresponding to the function identifier on the host.

19 Claims, 5 Drawing Sheets

(56) References Cited

U.S. PATENT DOCUMENTS

| | | | |
|---|---|---|---|
| 2013/0297673 A1* | 11/2013 | McGrath | G06F 9/505 |
| | | | 709/203 |
| 2015/0242520 A1 | 8/2015 | Li et al. | |
| 2015/0271067 A1 | 9/2015 | Li et al. | |
| 2015/0372943 A1 | 12/2015 | Hasan et al. | |
| 2016/0162320 A1* | 6/2016 | Singh | G06F 9/5005 |
| | | | 718/1 |
| 2016/0359764 A1* | 12/2016 | Fall | H04L 41/12 |
| 2016/0373345 A1 | 12/2016 | Li et al. | |
| 2018/0077024 A1* | 3/2018 | Zhang | H04L 63/0272 |
| 2018/0167270 A1* | 6/2018 | Carbone | H04L 41/0803 |
| 2018/0287865 A1* | 10/2018 | Gorelik | H04L 41/5048 |
| 2019/0108049 A1 | 4/2019 | Singh et al. | |

FOREIGN PATENT DOCUMENTS

| | | |
|---|---|---|
| CN | 104954281 A | 9/2015 |
| CN | 105095023 A | 11/2015 |
| CN | 105426250 A | 3/2016 |
| CN | 106681834 A | 5/2017 |
| CN | 107111519 A | 8/2017 |
| WO | 2015200012 A1 | 12/2015 |

* cited by examiner

SERVICE DEPLOYMENT METHOD AND FUNCTION MANAGEMENT PLATFORM UNDER SERVERLESS ARCHITECTURE

CROSS-REFERENCE TO RELATED APPLICATIONS

This is a continuation of Int'l Patent App. No. PCT/CN2017/109973 filed on Nov. 8, 2017, which is incorporated by reference.

TECHNICAL FIELD

This application relates to the field of information technology (IT), and in particular, to a service deployment method and a function management platform under a serverless architecture.

BACKGROUND

Conventional internet applications mainly use a client-server architecture. A server needs to maintain a service process over a long time to process client requests and call code logic to complete response procedures to the requests.

Serverless architectures constitute a latest emerging architecture model. In a serverless architecture, service logic is applied to form a plurality of independent functional components based on function as a service (FAAS) and provides a service to the outside in a form of an application programming interface (API).

Different from the conventional client-server architecture, in the serverless architecture, code of functional components may be stored in products such as Amazon Lambda, Azure Function, and Google Cloud Functions. Code is run only when a function is called, and when a call response ends, resources occupied for running the function are released. In the serverless architecture, a function is run in a stateless container, and may be triggered by an event and fully managed by a third party. Therefore, a tenant needs to care about only code implementation of a function, but not construction of a background server or an application service.

Function executors of different tenants in the serverless architecture are run in a shared service resource pool, and due to weak container isolation, a multi-tenant shared service resource pool is subject to security risks.

SUMMARY

Embodiments of this application provide a service deployment method and a function management platform under a serverless architecture, to resolve security risks resulting from running of function executors of different tenants in a shared service resource pool in the serverless architecture.

Specific technical solutions provided in the embodiments of this application are as follows.

According to a first aspect, a function management platform is provided, including a function scheduler and a function executor manager.

A gateway is an intermediate device between the function management platform and a tenant application. The gateway receives a function call request from the tenant application, where the function call request carries a function identifier; and forwards the function call request to the function scheduler. The function scheduler selects an available host based on resource pool information of a tenant, and sends a function instance creation request to the function executor manager, where the function instance creation request carries a host identifier of the available host and the function identifier, the resource pool information of the tenant includes a tenant identifier, a hosting flag, and a host identifier, the hosting flag is used to indicate that a host is managed by the function management platform, and a host corresponding to the host identifier is in a resource pool of the tenant. The function executor manager receives the function instance creation request, selects, based on the host identifier, a host running a function executor from the resource pool of the tenant, and creates a function executor corresponding to the function identifier on the host, so that the created function executor processes the function call request.

In this embodiment, a managed host is defined in the resource pool of the tenant, and the managed host is managed by the function management platform. When a user needs to call a function, a function executor is created on the managed host, thereby ensuring that the function executor is run in the resource pool of the tenant, and the managed host running the function executor is invisible to the user and is not directly operated by the user.

In this embodiment, function executors are created in resource pools of tenants, and because resource pools of different tenants are isolated from each other, function executors of different tenants are run in resource pools isolated from each other, thereby improving system security.

In a possible implementation, the function management platform records executor running information, where the executor running information includes a function identifier, and an identifier and a port of a host on which a function executor corresponding to the function identifier is located; and the function scheduler determines, based on the executor running information, whether there is an available function executor corresponding to the function identifier carried by the function call request, and if there is an available function executor corresponding to the function identifier carried by the function call request, obtains an identifier and a port of a host on which the available function executor is located, and forwards the function call request to the function executor based on the obtained host identifier and port.

When there is no available function executor corresponding to the function identifier carried by the function call request, the function scheduler sends a function instance creation request to the function executor manager, where the function instance creation request carries an available host identifier and the function identifier; and the function executor manager receives the function instance creation request, creates a function executor corresponding to the function identifier on the host corresponding to the available host identifier, allocates a port to the created function executor, and returns the identifier and the port of the host on which the created function executor is located to the function scheduler.

The function scheduler sends a host query request to a host pool manager, where the host query request carries the tenant identifier; and receives a host query response returned by the host pool manager, where the host query response carries the available host identifier.

When there is no available host for the tenant, the host pool manager creates a host in the resource pool of the tenant based on the tenant identifier, and returns an identifier of the created host as the available host identifier to the function scheduler.

The function scheduler obtains the identifier and the port of the host on which the created function executor is located from the function executor manager, and refreshes the executor running information.

Further, the function management platform may manage an executor of the tenant. Specifically, a policy engine of the function management platform determines whether a quantity of concurrent calls of a function has exceeded a maximum processing threshold of all executors of the function, and if the quantity of concurrent calls of the function has exceeded the maximum processing threshold of all the executors of the function, performs an executor scale-up operation to create a function executor for the function by using the function executor manager. Further, the policy engine may determine whether a quantity of concurrent calls of a function is less than a minimum processing threshold of all executors of the function, and if the quantity of concurrent calls of the function is less than the minimum processing threshold of all the executors of the function, perform an executor scale-down operation.

In performing a scale-down operation, the policy engine selects at least one host as a scale-down object, where function executors running on the scale-down object no longer process any new function call request; when a function executor running on the scale-down object completes processing a current task, removes the function executor; and after all the function executors on the scale-down object are removed, removes the scale-down object.

In a possible implementation, the resource pool information of the tenant further includes a shadow tenant identifier, and the function management platform creates a shadow tenant for each tenant, and records a correspondence between a tenant identifier and a shadow tenant identifier. When the resource pool information of the tenant includes a shadow tenant identifier, the host corresponding to the host identifier included in the resource pool information of the tenant is a host in a resource pool of the shadow tenant. The resource pool of the tenant and the resource pool of the shadow tenant interwork with each other through a tenant network.

When the function identifier carried in the function call request does not have a corresponding available function executor, the function scheduler queries a shadow tenant corresponding to the tenant based on the tenant identifier, selects an available host in the resource pool of the shadow tenant, and runs a function executor on the selected available host.

According to a second aspect, corresponding to the foregoing function management platform, an embodiment further provides a service deployment method.

The functional modules in the foregoing function management platform may be implemented using hardware, or implemented using corresponding software executed by hardware. The hardware or the software includes one or more modules corresponding to the foregoing functions. Functions of different modules may be combined into one module.

In a possible implementation, a physical server running the function management platform includes a transceiver, a processor, and a memory, where the processor is configured to execute program code stored in the memory to perform the method described in the second aspect.

According to a third aspect, an embodiment further provides a service deployment method, including: receiving, by a function executor manager, a function instance creation request from a function scheduler, where the function instance creation request is used to instruct the function executor manager to create a function executor on an available host selected by the function scheduler based on resource pool information of a tenant, the function instance creation request carries a function identifier and a host identifier of the available host, and the resource pool information of the tenant includes a tenant identifier, a hosting flag, and a host identifier, where the hosting flag is used to indicate that a host is managed by a function management platform, and a host corresponding to the host identifier is in a resource pool of the tenant; and selecting, by the function executor manager based on the host identifier, a host running a function executor from the resource pool of the tenant, and creating a function executor corresponding to the function identifier on the host, so that the created function executor processes a function call request.

According to a fourth aspect, an embodiment provides a service deployment apparatus, including a processor and a memory, where the processor executes a program instruction recorded in the memory to implement the method according to the third aspect.

According to a fifth aspect, a computer storage medium is provided to store a computer software instruction for use by the modules in the function management platform of the second aspect, where the computer storage medium includes a program designed to implement the foregoing aspects.

DESCRIPTION OF EMBODIMENTS

To make the objects, technical solutions and advantages of this application clearer, the following further describes this application with reference to the accompanying drawings.

Figure 1:
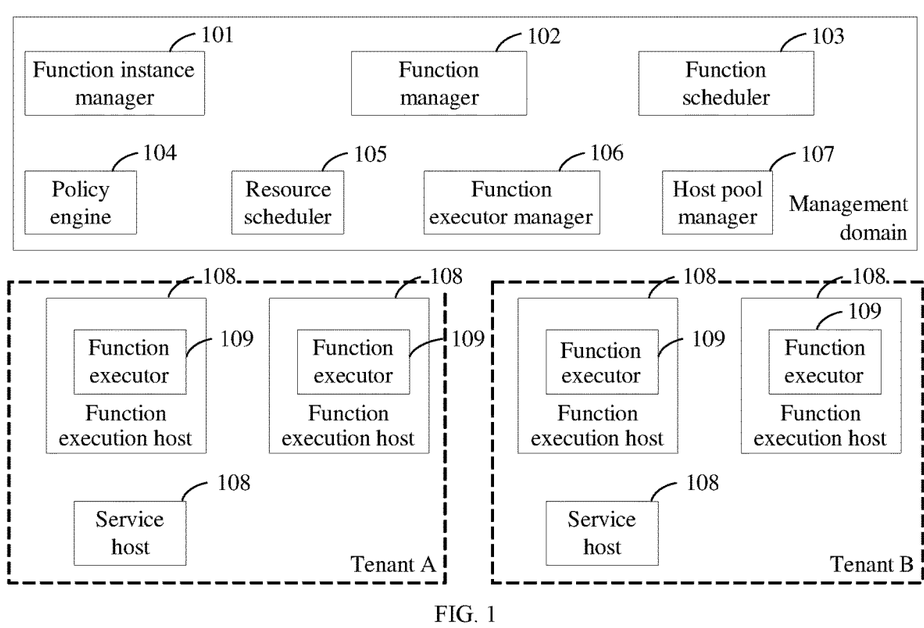
FIG. 1 is a schematic architectural diagram of a serverless system.

FIG. 1 is a schematic architectural diagram of a serverless system according to an embodiment of the present disclosure. The serverless system includes a management domain (that is, a function management platform) and a tenant domain. For example, the tenant domain includes two tenant resource pools.

The management domain includes a function instance manager 101, a function manager 102, a function scheduler 103, a policy engine 104, a resource scheduler 105, a function executor manager 106, and a host pool manager 107. In the tenant domain, each tenant resource pool includes several hosts 108. A host may be a function execution host running a function or a service host running a conventional service. A function executor 109 is run on the function execution host, and the function executor 109 is configured to receive and process a function call request. The host 108 may be a physical machine or a virtual machine.

In this embodiment, the function executor 109 is run in the tenant resource pool, and function executors 109 of all tenants are isolated from each other because the function executors are run in different tenant resource pools. To be specific, resource pool network isolation between different tenants is implemented by using a fundamental resource isolation capability of an infrastructure as a service (IaaS) platform. Because of mutual network isolation between hosts in resource pools of different tenants, function executors running on the hosts are also network-isolated.

For example, in a case of a public cloud, an application system designed by a cloud service provider allows a plurality of tenants to run in one environment. To protect privacy and security of tenant data, different tenants define their virtual resources based on their own needs while sharing hardware facilities of a data center, and the virtual resources of different tenants should be independent of and isolated from each other. By using an available multi-tenant technology, application context isolation and data isolation can be implemented between different tenants, so that applications of different tenants do not interfere with each other, and data confidentiality is improved. In a cloud computing system, each tenant has a set of virtual resources, which is referred to as a resource pool of the tenant.

After a host 108 is started, a function executor 109 is deployed on the host. The function executor 109 is provided by the IaaS platform and serves as an environment/sandbox for function running. The function executor encapsulates a context for function execution, for example, an environment variable and a dependent library.

When the tenant's service triggers a function call, a function call request is passed to the management domain through a network, and the function scheduler 103 or the function executor manager 106 of the management domain performs a request distribution operation, selects a host from the resource pool of the tenant, and sends the function call request to a function executor on the host for processing.

In a possible implementation, hosts 108 on which function executors 109 are located are connected through a tenant network. In the tenant network, a host running a function executor can interwork with a service host in another service system under a non-serverless architecture, to implement data transfer across serverless architectures.

In a possible implementation, the host 108 on which the function executor 109 is located is deployed in the resource pool of the tenant. Different from a service system under the non-serverless architecture, the host 108 on which the function executor 109 is located may be managed by the function management platform. The function management platform is responsible for a function operation, so that the tenant is not aware. In this serverless logical architecture, a user authorizes the function management platform to create and release resources (such as a host computing resource and a network resource), and for the tenant, a resource managed by the function management platform is invisible, unusable, and inaccessible. The managed resource neither requires explicit operation and maintenance by the tenant, nor charges the tenant.

In this embodiment, functions called by applications of different tenants need to be executed in respective resource pools of the tenants. Therefore, in a function calling process, it is indicated which tenant a function execution host belongs to and that the function execution host is managed by the function management platform.

The function instance manager 101 is configured to manage the function executor. A function instance query request is sent by the function scheduler 103 to the function instance manager 101, and the function instance manager 101 returns function instance information to the function scheduler 103. The function instance information includes an identifier and a port of a host on which an available function executor 109 is located. The host identifier is used to indicate an address of a host 108 on which the function executor 109 is located, the port is used to indicate a port, of the host 108, corresponding to the function executor 109, and the corresponding function executor 109 can be routed by using the host identifier and the port.

The function manager 102 is configured to record function information, including a function identifier and function description information. The description information includes a function software package location, a context to run the function, and the like.

The function scheduler 103 is configured to receive a function call request from a user and query the function instance manager 101 for an available function executor. Further, when there is no available function executor, the function scheduler 103 may be configured to initiate a host creation operation and an executor creation operation. It should be noted that some functions of the function scheduler 103 may be incorporated into the function instance manager 101, and the function instance manager 101 initiates a host creation operation and an executor creation operation.

It should be noted that, in a possible implementation, the function instance manager 101 may be integrated with the function scheduler 103. Functions of the function instance manager 101 may be performed by the function scheduler 103, or functions of the function scheduler 103 may be performed by the function instance manager 101.

The policy engine 104 is configured to trigger resource control procedures according to rules, including host scale-up and scale-down procedures and executor scale-up and scale-down procedures.

The resource scheduler 105 is configured to receive control instructions from the policy engine 104, and perform the host scale-up and scale-down procedures and the executor scale-up and scale-down procedures. In a possible implementation, the resource scheduler 105 may be integrated with the policy engine 104.

The function executor manager 106 is configured to perform function executor creation and removal. When a function executor needs to be created, the function executor manager 106 may obtain function description information from the function manager 102, and the function executor manager 106 receives an executor creation request and creates a function executor on a specified host based on the function description information.

The host pool manager 107 in the foregoing serverless architecture is configured to record a tenant-specific function execution host list. When an application of a tenant needs to call a function, if there is a function executor capable of running the called function in a resource pool of the tenant, the host pool manager 107 selects a corresponding host, and runs the called function in the function executor on the host; and if there is no appropriate host in the resource pool of the tenant, the host pool manager 107 creates a host in the resource pool of the tenant and runs the called function in the function executor on the created host. The created host needs to be in the resource pool of the tenant and kept isolated from other tenants.

In a possible implementation, the host pool manager 107 records host properties in a resource database. The host properties include a host identifier, a tenant identifier, and a hosting flag. The tenant identifier is used to indicate a tenant owning a host, the hosting flag is used to indicate that the host is managed by the function management platform. The function management platform performs operations such as creating, releasing, and scaling up host resources.

For example, the host properties are shown in the following table:

| Identifier | Tenant identifier (resource owner description) | Hosting flag |
|---|---|---|
| Host 1 | Tenant A | Tenant_function_service |
| Host 2 | Tenant B | Tenant_function_service |

In another possible implementation, a shadow tenant may be created for the tenant, and a resource pool may be allocated to the shadow tenant. The resource pool of the shadow tenant and that of the tenant are interconnected by routers in the tenant network. The function management platform records a correspondence between the tenant and the shadow tenant. For management of the shadow tenant, when an application of the tenant calls a function, the function management platform creates a host for the tenant in the resource pool of the shadow tenant based on the correspondence, and runs the called function in a function executor on the host.

Figure 2:
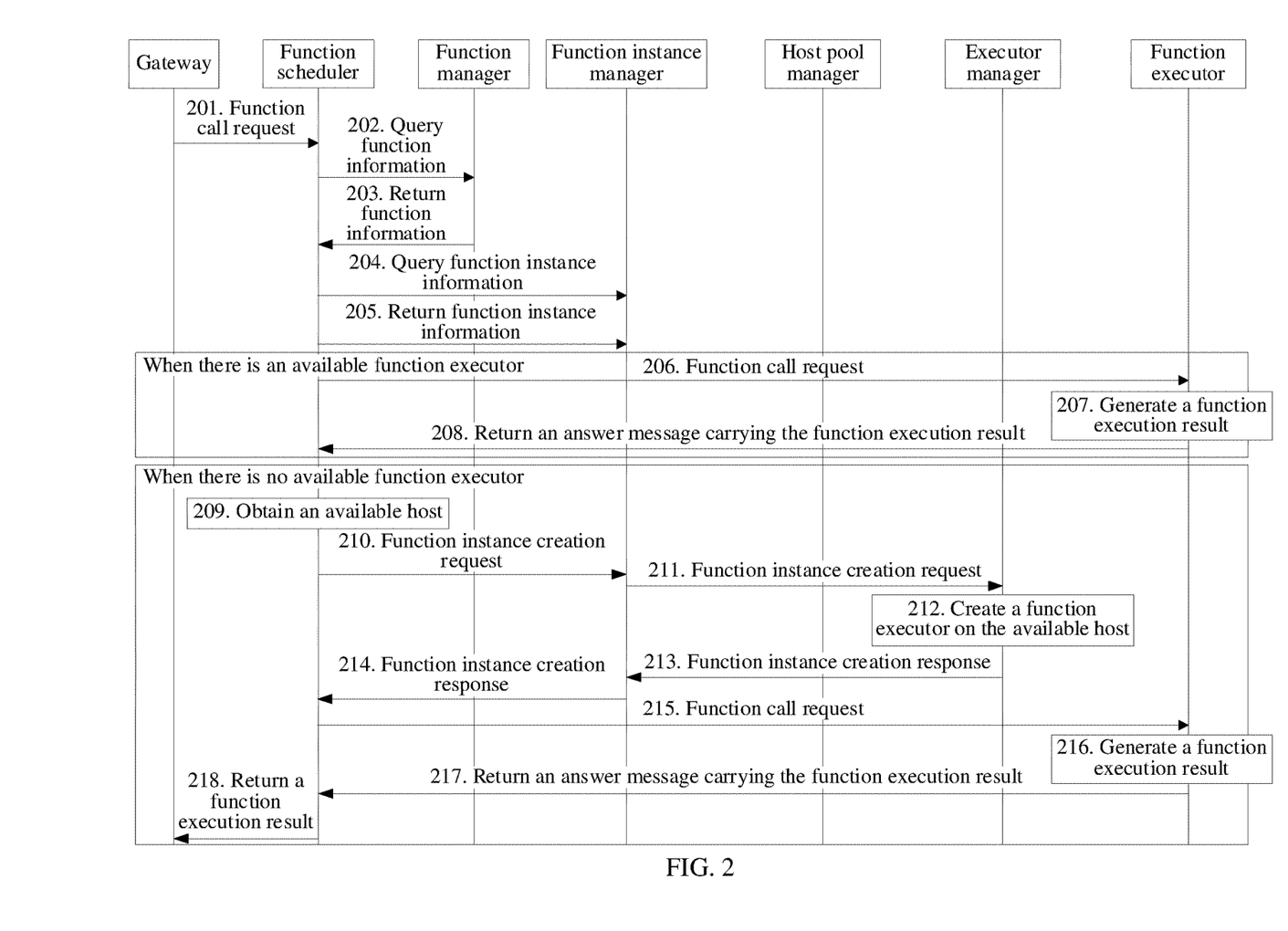
FIG. 2 is a schematic flowchart of service deployment according to an embodiment of this application.

Based on the serverless logical architecture shown in FIG. 1, FIG. 2 is a schematic diagram of a function call process according to an embodiment of the present disclosure.

Step 201: A tenant application performs a function call to send a function call request to a function scheduler through an API gateway, where the function call request carries a function identifier.

The tenant application in this embodiment may be an application of any type, and is used to call a function executor in a resource pool to execute a predetermined function, implement function processing, and obtain a returned execution result. A tenant may upload code of a function to a function management platform in advance. The function management platform may assign a function identifier to the tenant function. The function identifier can uniquely identify a function. For example, the function identifier is a Uniform Resource Locator (URL) or a character string.

Further, the function management platform may record a correspondence between a function identifier and a tenant identifier, and modules in the function management platform may use the function identifier to find corresponding tenant information.

The tenant uploads a function to the function management platform and defines the function there. In a possible implementation, a user uploads code of the function, defines a function access address, and a correspondence between a function identifier and the function access address, and records this information in a function manager. It should be noted that function related information may be recorded in a database of the function management platform and is accessible by the modules on the function management platform.

Step 202: The function scheduler sends a query request to the function manager, where the function query request carries the function identifier, and the function query request is used to query description information of a called function.

Step 203: The function manager queries the called function based on the function identifier, and returns the description information of the function to the function scheduler, for example, a function software package location and a context to run the function.

It should be noted that step 202 and step 203 are optional steps. When there is an executor corresponding to the called function running in the resource pool of the tenant, the executor may directly process the function call request without obtaining function code based on the function description information in advance.

Step 204: The function scheduler sends a function instance information query request to a function instance manager, where the function instance information query request carries the function identifier.

Step 205: The function instance manager returns function instance information to the function scheduler based on the function identifier, where the function instance information includes an IP address and a port of a host on which an executor is located. The port has a one-to-one correspondence with the executor running on the host.

In a possible implementation, a cloud computing system includes a plurality of tenants. When different tenants define functions with a same function identifier, the function instance information query request further includes a tenant identifier, and the function instance manager identifies a function of a corresponding tenant based on the tenant identifier and the function identifier. Further, the function instance manager queries the resource pool of the tenant for an available executor based on the tenant identifier and the function identifier. If there is an available executor, the function instance information is returned.

In another possible implementation, a function identifier is unique in a serverless system, and there is no different function with a same function identifier. In this case, the function instance manager may query the resource pool of the tenant for an available executor based on the function identifier carried by the function instance information query request.

The function management platform records a correspondence between a function identifier and a tenant identifier, resource pool information of the tenant, and running information of an idle executor. The resource pool information of the tenant includes a tenant identifier, a hosting flag, and a host identifier. The host identifier includes an IP address of a host, the running information of the idle executor includes a function identifier, and an identifier and a port of a host on which an executor corresponding to the function identifier is located.

Specifically, in a possible implementation, the foregoing information may be recorded by the function instance manager in the function management platform. When a state of a function executor changes, the function instance manager updates the foregoing information. For example, state changes of a function executor include: creation of a function executor, occupation of a function executor, and a function executor becoming idle.

In this embodiment, the available executor refers to an idle executor that can run the called function.

Further, there may be a plurality of available executors in the resource pool of the tenant, and the plurality of executors is run on at least one host. In this case, the function instance manager may use a list to add an IP address and a port of a host on which each of the available executors is located to the function scheduler, and the function scheduler selects an executor from the list to execute the called function. A specific selection manner may be random selection, or selection based on host load. For example, the function scheduler determines a quantity of executors that are run on each host in the resource pool of the tenant, and deploys a created executor on a least-loaded host.

When there is no available executor in the resource pool of the tenant, the function instance manager returns a failure response to the function scheduler. Specifically, a list of available executors carried by the failure response is empty.

When there is an available executor, step 206 is performed; when there is no available executor, step 209 is performed.

Step 206: The function scheduler forwards the function call request carrying the function identifier to an available function executor.

The function scheduler selects the available executor from the list of available executors, obtains an IP address and a port corresponding to the available executor, and sends the function call request to the obtained IP address and port.

The function scheduler may select executors according to a specific rule, thereby ensuring that executors are evenly distributed on hosts.

Step 207: The function executor runs the called function based on the function identifier and generates a function execution result.

When the function executor is a general-purpose executor, the function executor downloads and executes code of the called function, obtains a parameter of the function call request, and generates a function execution result. A manner in which the function executor obtains the code of the called function may be: using an existing technology of a serverless architecture to find a corresponding function by using a framework. This is not limited in this embodiment.

When the executor has run the called function, it is unnecessary to download the code of the called function. Instead, the parameter of the function call request is directly obtained to generate the function execution result.

Step 208: The function executor returns an answer message to the function scheduler, where the answer message carries the function execution result.

Step 209: After receiving the failure response returned by the function instance manager, the function scheduler determines whether there is an available host in the resource pool of the tenant, and if there is an available host in the resource pool of the tenant, returns a host identifier to the function instance manager to instruct the function instance manager to create a function executor on a host corresponding to the host identifier; or if there is no available host in the resource pool of the tenant, sends a host creation request to a host pool manager to create a host running a function executor.

Specifically, the function scheduler may send a host query request to the host pool manager to determine whether there is an available host, where the host query request carries the tenant identifier. The host pool manager queries the resource pool of the tenant for an idle host and returns a list of available hosts to the function scheduler, where the list of available hosts carries an identifier of an available host.

Further, when a resource of a specific function needs to be guaranteed, the host query request may further carry a function identifier, and the host pool manager selects an appropriate idle host. For example, when a function has a high input/output (I/O) requirement, the host pool manager may select, based on the function identifier, an idle host that provides satisfactory IO performance.

Step 210: The function scheduler sends a function instance creation request to the function instance manager, where the function instance creation request carries the host identifier and the function identifier.

Step 211: The function instance manager sends a function instance creation request to the function executor manager, where the function instance creation request carries the host identifier and the function identifier.

Step 212: The function executor manager receives the function instance creation request, selects a host running a function executor from the resource pool of the tenant based on the host identifier, creates a function executor on the host, and allocates a port of the host to the function executor.

The function executor manager obtains and runs function code and a function context based on the function identifier, and creates the executor.

After the function executor is created, the function management platform records the function identifier, and the identifier and the port of the host on which the function executor is located, and refreshes the running information of the idle executor that is recorded in the function management platform.

Step 213: The function executor manager returns a function executor creation response to the function instance manager, where the function executor creation response carries the identifier and the port of the host on which the function executor is located.

Step 214: The function instance manager forwards the function executor creation response to the function scheduler.

Step 215: The function scheduler forwards the function call request to the corresponding function executor.

Step 216: The function executor runs the called function and generates a function execution result.

Step 217: The function executor returns an answer message to the function scheduler, where the answer message carries the function execution result.

Steps 215 to 217 are similar to steps 206 to 208, and are not described in detail in this embodiment.

Step 218: After execution of the function is completed, the function scheduler returns a function execution result to the tenant application through the API gateway.

This embodiment provides a function executor deployment method that is based on a tenant-isolated function resource pool. A function executor created for a tenant is run on a host in a resource pool of the tenant, avoiding that function executors of different tenants are run in one shared service resource pool, and resolving security risks arising from a multi-tenant shared service resource pool.

Further, based on the foregoing serverless logical architecture, an embodiment further provides a 2-level function scheduling method, to balance resource utilization and isolation requirements of a function running resource pool, and improve a control granularity of resource utilization.

In this embodiment, a function execution host is run in a resource pool of a tenant, and because resource pools of tenants are isolated from each other, the function execution host is exclusive to the tenant. A time length required for creating or releasing the function execution host is typically in minutes, and is a relatively long time. Therefore, creation or release of the function execution host cannot be performed frequently. To improve resource utilization, an embodiment further provides a resource control method. Specifically, this embodiment discloses a resilient resource control method with two stages: a function executor state and a function execution host stage. When services peak, a host scale-up operation (including an increase of quantity or specification) is performed; and when services decline, a host scale-down operation (including a decrease of quantity or specification) is performed.

Figure 3:
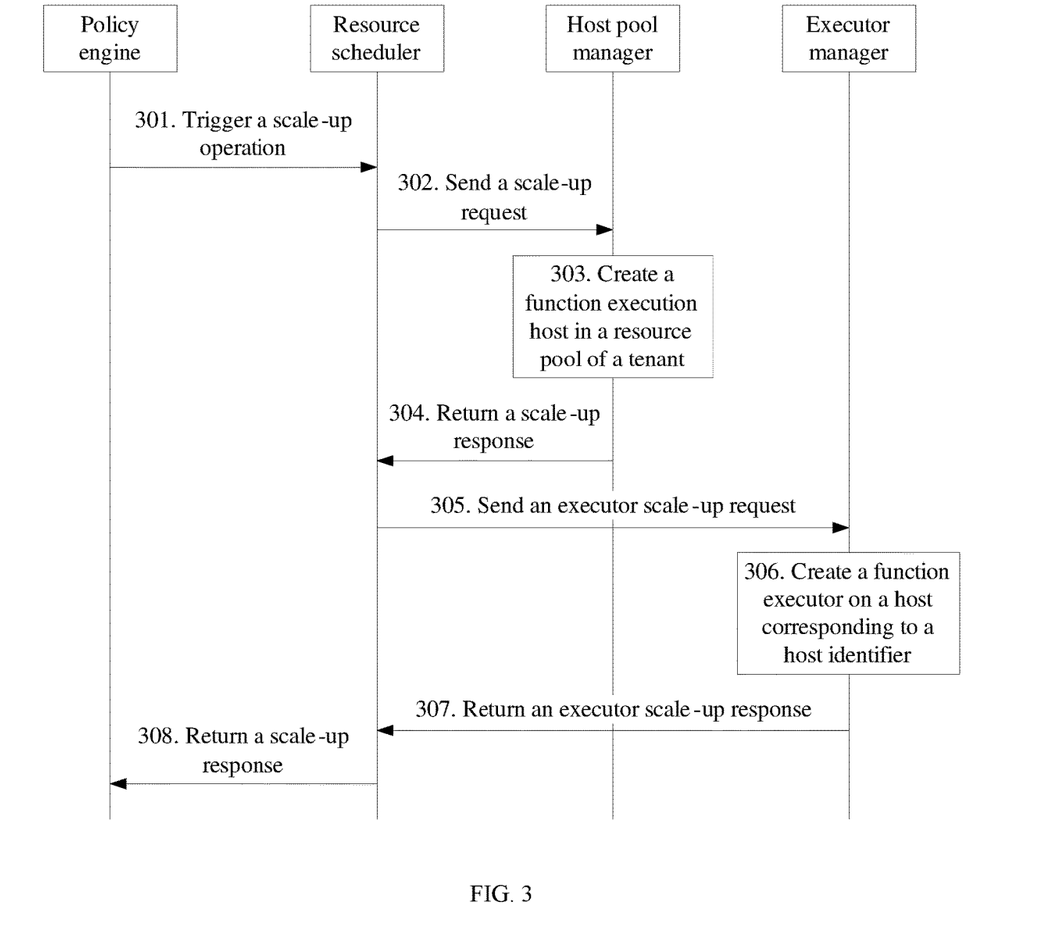
FIG. 3 is a schematic flowchart of a scale-up operation according to an embodiment of this application.

FIG. 3 is a flowchart of a resilient resource control method according to an embodiment of the present disclosure. This resilient resource control method is used for a scale-up operation, and includes the following steps.

Step 301: A policy engine triggers scale-up of a function execution host pool, and sends a scale-up request to a resource scheduler, where the scale-up request carries a tenant identifier.

In this embodiment, the policy engine triggers scaling of the function execution host based on CPU and memory indicators and the like, or a weighted combination of indicators. That is, when resource utilization of hosts running in a resource pool of a tenant exceeds a scale-up threshold, the policy engine triggers scale-up of the host pool. A to-be-increased capacity may be based on a current value or a historical mean of resource utilization, or may be calculated as a value predicted based on historical data. The to-be-increased capacity may be a quantity of hosts or a quantity of CPUs/memories.

Step 302: The resource scheduler sends a scale-up request to a host pool manager, where the scale-up request carries the tenant identifier and the to-be-increased capacity.

Step 303: The host pool manager performs a scale-up operation, and creates a function execution host in the resource pool of the tenant based on the tenant identifier and the to-be-increased capacity, where a quantity of created function execution hosts satisfies the to-be-increased capacity.

Step 304: The host pool manager returns a scale-up response to the resource scheduler, where the scale-up response carries an identifier of the created function execution host.

Further, the policy engine may further determine whether to perform function executor scaling based on a quantity of concurrent calls of a function. When the quantity of concurrent calls of the function exceeds a processing threshold of all executors of the function, a processor scale-up operation corresponding to the function is performed. The policy engine may further include a function identifier in the scale-up request in step 101 to instruct to scale up an executor corresponding to the function identifier. Alternatively, the policy engine may send an executor scale-up request to the resource scheduler, to separate an executor scale-up operation from a host scale-up operation.

Step 305: The resource scheduler sends an executor scale-up request to a function executor manager, where the executor scale-up request carries a host identifier, a function identifier, and a quantity of to-be-created executors.

Step 306: The function executor manager performs a scale-up operation, and creates a function executor on a host corresponding to the host identifier.

Step 307: The function executor manager returns an executor scale-up response to the resource scheduler, where the executor scale-up response carries the function identifier and an identifier and a port of a host on which the executor is located.

Step 308: The resource scheduler returns a scale-up response to the policy engine, where the scale-up response carries the function identifier, and the identifier and the port of the host on which the executor is located.

Host-level scaling and executor-level scaling may both be triggered based on the current value or the historical mean of resource utilization, or the value predicted based on the historical data. In general, the two levels of scaling can collaborate with each other. Function execution host scaling takes precedence over function executor scaling. The function execution host scaling has a coarser granularity and is not so sensitive to service changes, while the function executor scaling has a finer granularity and can quickly follow service changes.

In a possible implementation, resilient resource scaling may be timed or pre-agreed, and initial allocation quantities of the two levels of resources may be calculated based on estimated service load, concurrent service load, and a processing latency of a user, to implement resource reservation for a predictable service.

Figure 4:
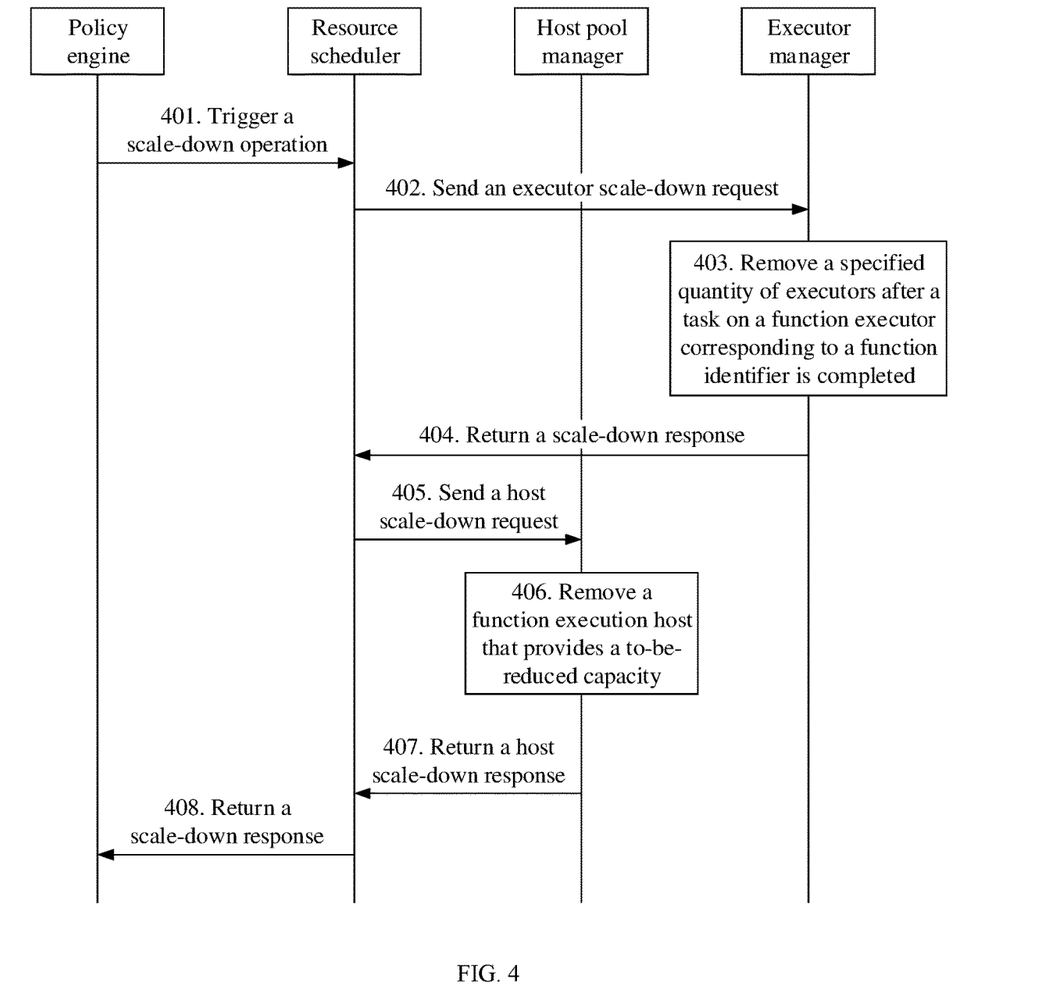
FIG. 4 is a schematic flowchart of a scale-down operation according to an embodiment of this application.

Corresponding to the foregoing scale-up operation, an embodiment further provides an execution flow of a scale-down operation. FIG. 4 is a flowchart of another resilient resource control method according to an embodiment of the present disclosure. This resilient resource control method is used for a scale-down operation, and includes the following steps.

Step 401: A policy engine triggers scale-down of a function execution host pool, to send a scale-down request to a resource scheduler, where the scale-down request carries a function identifier.

The policy engine determines whether to perform a scale-down operation based on a policy similar to that in step 301. For example, the policy engine may determine whether a quantity of concurrent calls of a current function is less than a minimum processing threshold of all executors of the function, and if the quantity of concurrent calls of the current function is less than the minimum processing threshold of all the executors of the function, it indicates that function executors are in an excessive quantity and there is a waste of resources. In this case, a function executor scale-down operation is performed. Further, the policy engine may further determine whether there is an idle host among currently available hosts, that is, whether there is a host on which no function executor is run, and if there is an idle host, a scale-down operation is performed on the idle host to remove the idle host.

Still further, the policy engine may predefine a scale-down policy. When overall resource utilization of hosts in the host pool is relatively low, some hosts are selected as scale-down objects, and the hosts selected as scale-down objects no longer perform new tasks. After task processing on a host as a scale-down object is completed, a function executor is removed, and after all function executors on the host are removed, the idle host is removed.

When the policy engine determines that a scale-down operation needs to be performed on an executor of a function, a scale-down request is sent to the resource scheduler, where the scale-down request carries a function identifier and a quantity of to-be-reduced executors.

Step 402: The resource scheduler sends an executor scale-down request to a function executor manager, where the executor scale-down request carries the function identifier and the quantity of to-be-reduced executors.

Step 403: The function executor manager performs a scale-down operation.

Specifically, the function executor manager removes a specified quantity of executors after a task on a function executor corresponding to the function identifier is completed.

Step 404: The function executor manager returns an executor scale-down response to the resource scheduler, where the executor scale-down response carries an identifier and a port of a host on which the removed executor is located.

Step 405: The resource scheduler asynchronously instructs to perform host pool scale-down, and sends a scale-down request to a host pool manager, where the scale-down request carries a tenant identifier and a to-be-reduced capacity.

Step 406: The host pool manager performs a scale-down operation on a host pool of a tenant based on the tenant identifier, and removes a function execution host that provides the to-be-reduced capacity.

Step 407: The host pool manager returns a scale-down response to the resource scheduler, where the scale-down response carries an identifier of the removed host.

Step 408: The resource scheduler returns the scale-down response to the policy engine, where the scale-down response carries the identifier of the removed host.

After a scale-up operation or a scale-down operation is completed, a function management platform updates executor information of the tenant, including updating host pool information of the tenant, running information of the function executor, and the like.

Figure 5:
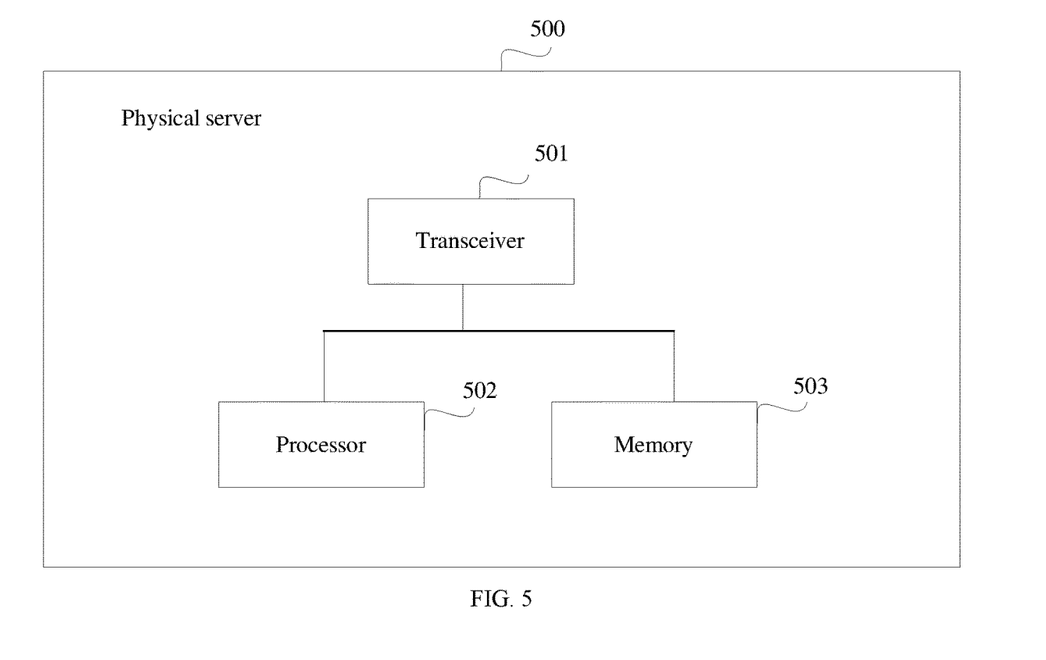
FIG. 5 is a schematic structural diagram of a physical server running functional components of a function management platform according to an embodiment of this application.

Corresponding to the foregoing function management platform and the service deployment method, an embodiment provides a physical server running the function management platform. Referring to FIG. 5, a physical server 500 includes a transceiver 501, a processor 502, and a memory 503. The transceiver 501 and the memory 503 are both connected to the processor 502. It should be noted that the connection manner between the components shown in FIG. 5 is only a possible example. Alternatively, the transceiver 501 and the memory 503 may both be connected to the processor 502, and there is no connection between the transceiver 501 and the memory 503, or there may be another possible connection manner.

The memory 503 stores a set of programs, and the processor 502 is configured to call a program stored in the memory 503 to perform functions of the modules in the function management platform and the service deployment method shown in FIG. 2 to FIG. 4.

In FIG. 5, the processor 502 may be a central processing unit CPU, a network processor (NP), or a combination of a CPU and an NP.

The processor 502 may further include a hardware chip. The hardware chip may be an application-specific integrated circuit (ASIC), a programmable logic device (PLD), or a combination thereof. The PLD may be a complex PLD (CPLD), a field-programmable gate array (FPGA), a generic array logic (GAL), or any combination thereof.

The memory 503 may include a volatile memory, for example, a random access memory RAM); or the memory 503 may include a non-volatile memory, for example, a flash memory, a hard disk drive (HDD) or a solid-state drive (SSD); or the memory 503 may include a combination of the foregoing types of memories.

Each functional module in the function management platform may be run on the physical server shown in FIG. 5, alone or in a combination, and details are not described herein.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

Code of these computer programs may be stored in a computer readable memory that can guide a computer or another programmable data processing device to operate in a particular manner.

It is clearly that persons skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A service deployment method comprising:
  receiving, by a function scheduler, a function call request carrying a function identifier;
  selecting, by the function scheduler based on resource pool information of a tenant, a host that is available in a resource pool, wherein the resource pool information comprises a host identifier of the host, wherein the resource pool is isolated from other resource pools corresponding to other tenants, and wherein the host is exclusive to the tenant;
  sending, by the function scheduler to a function executor manager, a function instance creation request carrying the function identifier and the host identifier;
  receiving, by the function executor manager from the function scheduler, the function instance creation request;
  selecting, by the function executor manager based on the host identifier, the host based on the host identifier;
  determining, by a policy engine, whether a quantity of concurrent calls of a function has exceeded a maximum processing threshold of all executors of the function; and
  performing, by the policy engine when the quantity has exceeded the maximum processing threshold, an executor scale-up operation to create, by using the function executor manager and based on the function identifier, a function executor to process the function call request.

2. The service deployment method of claim 1, further comprising:
  recording, by a function management platform, executor running information comprising the function identifier, the host identifier, and a host port of the host on which the function executor is located;
  determining, by the function scheduler, based on the executor running information, and before sending the function instance creation request, that the function executor is available;
  obtaining, by the function scheduler, the host identifier and the host port; and
  forwarding, by the function scheduler, to the function executor, and based on the host identifier and the host port, the function call request.

3. The service deployment method of claim 1, further comprising:
  recording, by a function management platform, executor running information comprising the function identifier, the host identifier, and a host port of the host on which the function executor is located;
  determining, by the function scheduler, based on the executor running information, and before sending the function instance creation request, that the function executor is available;
  sending, by the function scheduler to the function executor manager, the function instance creation request;
  creating, by the function executor manager, the function executor;
  allocating, by the function executor manager, a port to the function executor; and returning, by the function executor manager, the host identifier and the host port to the function scheduler.

4. The service deployment method of claim 3, wherein before sending the function instance creation request, the service deployment method further comprises:
sending, by the function scheduler to a host pool manager, a host query request carrying a tenant identifier; and
receiving, by the function scheduler from the host pool manager, a host query response carrying the host identifier.

5. The service deployment method of claim 4, wherein when there is no available host for the tenant, the service deployment method further comprises:
creating, by the host pool manager based on the tenant identifier, the host in the resource pool; and
returning, by the host pool manager to the function scheduler, the host identifier.

6. The service deployment method of claim 3, further comprising:
obtaining, by the function scheduler from the function executor manager, the host identifier and the host port; and
refreshing, by the function scheduler, the executor running information.

7. The service deployment method of claim 1, further comprising:
determining, by the policy engine, whether the quantity is less than a minimum processing threshold of all executors of the function; and
performing, by the policy engine when the quantity is less than the minimum processing threshold, an executor scale-down operation.

8. The service deployment method according to claim 7, further comprising:
selecting, by the policy engine, the host as a scale-down object that will not process a new function call request;
removing, by the policy engine, the function executor when the function executor completes processing of a current task; and
removing, by the policy engine after removing the function executor, the scale-down object.

9. A service deployment apparatus comprising:
a function scheduler configured to:
receive a function call request carrying a function identifier,
select, based on resource pool information of a tenant, a host that is available in a resource pool, wherein the resource pool information comprises a host identifier of the host, wherein the resource pool is isolated from other resource pools corresponding to other tenants, and wherein the host is exclusive to the tenant; and
send a function instance creation request carrying the function identifier and the host identifier;
a function executor manager coupled to the function scheduler and configured to:
receive, from the function scheduler, the function instance creation request, and
select, based on the host identifier, the host based on the host identifier; and
a policy engine configured to:
determine whether a quantity of concurrent calls of a function has exceeded a maximum processing threshold of all executors of the function, and
perform, when the quantity has exceeded the maximum processing threshold, an executor scale-up operation to create, by using the function executor manager and based on the function identifier, a function executor to process the function request.

10. The service deployment apparatus of claim 9, further comprising a function management platform coupled to the function scheduler and configured to record executor running information comprising the function identifier, the host identifier, and a host port of the host on which the function executor is located, wherein the function scheduler is further configured to:
determine, based on the executor running information and before sending the function instance creation request, that the function executor is available;
obtain the host identifier and the host port; and
forward, to the function executor based on the host identifier and the host port, the function call request.

11. The service deployment apparatus of claim 9, further comprising a function management platform coupled to the function scheduler and configured to record executor running information comprising the function identifier, the host identifier, and a host port of the host on which the function executor is located, wherein the function scheduler is further configured to:
determine, based on the executor running information and before sending the function instance creation request, that the function executor is available; and
send, to the function executor manager, the function instance creation request, and
wherein the function executor manager is further configured to:
create the function executor;
allocate a port to the function executor; and
return the host identifier and the host port to the function scheduler.

12. The service deployment apparatus of claim 11, further comprising a host pool manager coupled to the function scheduler, wherein before sending the function instance creation request, the function scheduler is further configured to:
send, to the host pool manager, a host query request carrying a tenant identifier; and
receive, from the host pool manager, a host query response carrying the host identifier.

13. The service deployment apparatus of claim 12, wherein when there is no available host for the tenant, the host pool manager is configured to:
create, based on the tenant identifier, the host in the resource pool; and
return, to the function scheduler, the host identifier.

14. The service deployment apparatus of claim 11, wherein the function scheduler is further configured to:
obtain, from the function executor manager, the host identifier and the host port; and
refresh the executor running information.

15. The service deployment apparatus of claim 9, wherein the policy engine is further configured to:
determine whether the quantity is less than a minimum processing threshold of all executors of the function; and
perform, when the quantity is less than the minimum processing threshold, an executor scale-down operation.

16. The service deployment apparatus of claim 15, further comprising a policy engine configured to:
select the host as a scale-down object that will not process a new function call request;
remove the function executor when the function executor completes processing of a current task; and remove, after removing the function executor, the scale-down object.

17. The service deployment apparatus of claim 9, further comprising:
a memory configured to store a set of programs; and
a processor coupled to the memory and configured to call at least one of the programs to perform functions of the function scheduler and the function executor manager.

18. A computer program product comprising instructions that are stored on a non-transitory computer-readable medium and that, when executed by a processor, cause a service deployment apparatus
to: receive, by a function scheduler, a function call request carrying a function identifier;
select, by the function scheduler based on resource pool information of a tenant, a host that is available in a resource pool, wherein the resource pool information comprises a host identifier of the host, wherein the resource pool is isolated from other resource pools corresponding to other tenants, and wherein the host is exclusive to the tenant;
send, by the function scheduler to a function executor manager, a function instance creation request carrying the function identifier and the host identifier;
receive, by the function executor manager from the function scheduler, the function instance creation request;
select, by the function executor manager based on the host identifier, the host based on the host identifier;
determine, by a policy engine, whether a quantity of concurrent calls of a function is less than a minimum processing threshold of all executors of the function; and
perform, by the policy engine when the quantity is less than the minimum processing threshold, an executor scale-down operation.

19. The computer program product of claim 18, wherein the instructions, when executed by the processor, further cause the service deployment apparatus to:
determine, by the policy engine, whether the quantity of concurrent has exceeded a maximum processing threshold of all executors of the function; and
perform, when the quantity has exceeded the maximum processing threshold, an executor scale-up operation to create, by using the function executor manager and based on the function identifier, a function executor to process the function call request.

* * * * *